(12) United States Patent
Wang et al.

(10) Patent No.: US 10,873,356 B2
(45) Date of Patent: Dec. 22, 2020

(54) ELECTRONIC DEVICE

(71) Applicant: Huawei Technologies Co., Ltd., Shenzhen (CN)

(72) Inventors: Qiliang Wang, Shanghai (CN); Xiaolong Wang, Shenzhen (CN); Gaobing Lei, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/349,718

(22) PCT Filed: Mar. 22, 2017

(86) PCT No.: PCT/CN2017/077739
§ 371 (c)(1),
(2) Date: May 14, 2019

(87) PCT Pub. No.: WO2018/090516
PCT Pub. Date: May 24, 2018

(65) Prior Publication Data
US 2020/0195288 A1   Jun. 18, 2020

(30) Foreign Application Priority Data
Nov. 17, 2016   (CN) .......................... 2016 1 1018015

(51) Int. Cl.
*H04B 1/3816*   (2015.01)
*G06K 7/00*   (2006.01)
(Continued)

(52) U.S. Cl.
CPC ......... *H04B 1/3816* (2013.01); *G06K 7/0021* (2013.01); *H01R 12/71* (2013.01);
(Continued)

(58) Field of Classification Search
CPC .... H04B 1/3816; G06K 7/0021; H01R 12/71; H01R 13/02; H01R 13/627–629
See application file for complete search history.

(56) References Cited

U.S. PATENT DOCUMENTS 5,655,917 A * 8/1997 Kaneshige ............. G06K 13/08
439/155
5,823,828 A * 10/1998 Bricaud ............... G06K 7/0021
439/630

(Continued)

FOREIGN PATENT DOCUMENTS

CN   2736965 Y   10/2005
CN   201174723 Y   12/2008
(Continued)

OTHER PUBLICATIONS

Translation of TWI600215 (Year: 2020).*
(Continued)

Primary Examiner — Gennadiy Tsvey
(74) Attorney, Agent, or Firm — Conley Rose, P.C.

(57) ABSTRACT

An electronic device includes a printed circuit board and a card holder. The card holder is configured to hold a function card, and the printed circuit board is provided with a groove. The card holder is disposed in the groove. A bottom surface of the groove is provided with n metal solder pads and n printed wires. The n metal solder pads are electrically connected to the n printed wires in a one-to-one correspondence. N terminals in a one-to-one correspondence to the n metal solder pads are disposed on the card holder. Each terminal is provided with a first contact and a second contact. The first contact is connected to and in contact with one of the n metal solder pads. The second contact is configured to connect to and be in contact with a metal contact of the function card placed in the card holder.

20 Claims, 4 Drawing Sheets

(51) Int. Cl.
*H01R 12/71* (2011.01)
*H01R 13/02* (2006.01)
*H01R 13/627* (2006.01)
*H01R 13/629* (2006.01)

(52) U.S. Cl.
CPC ............ *H01R 13/02* (2013.01); *H01R 13/627* (2013.01); *H01R 13/629* (2013.01)

(56) References Cited

U.S. PATENT DOCUMENTS

| | | | | |
|---|---|---|---|---|
| 6,129,558 | A * | 10/2000 | Kihira | G06K 7/0021 439/630 |
| 6,129,588 | A * | 10/2000 | Chang | G06K 7/0021 439/630 |
| 6,175,505 | B1 | 1/2001 | Cheng et al. | |
| 6,382,995 | B1 * | 5/2002 | Bricaud | H01R 13/635 439/159 |
| 7,059,911 | B2 * | 6/2006 | Uchida | H01R 13/24 439/630 |
| 7,207,814 | B2 * | 4/2007 | Chen | H01R 13/6595 439/159 |
| 7,261,578 | B2 * | 8/2007 | Zhao | H01R 13/633 439/159 |
| 7,309,245 | B2 * | 12/2007 | Sadatoku | H01R 13/635 439/159 |
| 9,197,021 | B2 * | 11/2015 | Joo | G06K 7/003 |
| 2010/0112839 | A1 * | 5/2010 | Sun | H01R 12/7094 439/152 |
| 2011/0039442 | A1 * | 2/2011 | Kim | G06K 7/0021 439/377 |
| 2011/0242783 | A1 * | 10/2011 | Zhou | G06K 7/006 361/784 |
| 2013/0210280 | A1 * | 8/2013 | Soo | H01R 4/02 439/626 |
| 2014/0016275 | A1 * | 1/2014 | Takasaki | G06K 13/085 361/727 |
| 2015/0311655 | A1 | 10/2015 | Han et al. | |
| 2015/0318650 | A1 * | 11/2015 | Qian | G06K 19/07732 439/620.15 |
| 2015/0373827 | A1 | 12/2015 | Guo et al. | |
| 2016/0149330 | A1 | 5/2016 | Kusuhara et al. | |

FOREIGN PATENT DOCUMENTS

| | | |
|---|---|---|
| CN | 202178417 U | 3/2012 |
| CN | 102610950 A | 7/2012 |
| CN | 202678553 U | 1/2013 |
| CN | 203839539 U | 9/2014 |
| CN | 204348990 U | 5/2015 |
| CN | 204597099 U | 8/2015 |
| CN | 104902039 A | 9/2015 |
| CN | 105025129 A | 11/2015 |
| CN | 105790014 A | 7/2016 |
| EP | 2922148 A1 | 9/2015 |
| JP | 2011096927 A | 5/2011 |
| JP | 2012109165 A | 6/2012 |
| JP | 2015133222 A | 7/2015 |
| TW | M360485 U | 7/2009 |
| TW | 201639245 A | 11/2016 |

OTHER PUBLICATIONS

Foreign Communication From a Counterpart Application, European Application No. 17871260.0, Extended European Search Report dated Sep. 30, 2019, 5 pages.
Machine Translation and Abstract of Chinese Publication No. CN2736965, dated Oct. 26, 2005, 11 pages.
Machine Translation and Abstract of Chinese Publication No. CN102610950, dated Jul. 25, 2012, 7 pages.
Machine Translation and Abstract of Chinese Publication No. CN104902039, dated Jun. 9, 2015, 15 pages.
Machine Translation and Abstract of Chinese Publication No. CN105025129, dated Nov. 4, 2015, 10 pages.
Machine Translation and Abstract of Chinese Publication No. CN105790014, dated Jul. 20, 2016, 14 pages.
Machine Translation and Abstract of Chinese Publication No. CN201174723, dated Dec. 31, 2008, 4 pages.
Machine Translation and Abstract of Chinese Publication No. CN202178417, dated Mar. 28, 2012, 8 pages.
Machine Translation and Abstract of Chinese Publication No. CN202678553, dated Jan. 16, 2013, 9 pages.
Machine Translation and Abstract of Chinese Publication No. CN203839539, dated Sep. 17, 2014, 13 pages.
Machine Translation and Abstract of Chinese Publication No. CN204348990, dated May 20, 2015, 5 pages.
Machine Translation and Abstract of Chinese Publication No. CN204597099, dated Aug. 26, 2015, 13 pages.
Machine Translation and Abstract of Taiwanese Publication No. TW201639245, dated Nov. 1, 2016, 15 pages.
Foreign Communication From a Counterpart Application, Chinese Application No. 201780009654.2, Chinese Office Action dated Mar. 5, 2019, 8 pages.
Foreign Communication From a Counterpart Application, PCT Application No. PCT/CN2017/077739, English Translation of International Search Report dated Jul. 11, 2017, 2 pages.
Foreign Communication From a Counterpart Application, PCT Application No. PCT/CN2017/077739, English Translation of Written Opinion dated Jul. 11, 2017, 3 pages.

* cited by examiner

ELECTRONIC DEVICE

CROSS-REFERENCE TO RELATED APPLICATIONS

This application is a National Stage of International Application No. PCT/CN2017/077739, filed on Mar. 22, 2017, which claims priority to Chinese Patent Application No. 201611018015.6, filed on Nov. 17, 2016, both of which are hereby incorporated by reference in their entireties.

TECHNICAL FIELD

This application relates to the field of electronic technologies, and in particular, to an electronic device.

BACKGROUND

With continuous advance of communication science, and continuous development of electronic technologies, structures, styles, and performance of electronic devices are also changing with each passing day. Moreover, people also have more and higher requirements on outline sizes of the electronic devices, and lightening, thinning and aesthetic design gradually become main standards for people to select an electronic device. Generally, to implement customer identification or performance extension, various function cards usually need to be installed in an electronic device, and the function cards are installed in the electronic device and are configured to implement a plurality of functions such as communication or storage. The function card is, for example, a SIM card (Subscriber Identification Module Card), an integrated circuit card (Integrated Circuit Card), an expansion card, or a storage card.

In the prior art, when a function card is installed on an electronic device, a frequently used solution is that a card holder of the function card disposed above a printed circuit board of the electronic device, the function card is installed on the card holder, and moreover the function card is electrically connected to the printed circuit board in a welding manner or by using a conducting wire, thereby installing the function card. Specifically, FIG. 1 shows an electronic device in the prior art. A function card (shown in the figure) is electrically connected onto a printed circuit board 01, and a card holder 02 is disposed on the printed circuit board 01, the card holder 02 may hold the function card. To electrically connect the function card to the printed circuit board 01, a terminal 03 is disposed on the card holder 02, a first end 031 of the terminal 03 is fastened onto the card holder 02, a middle portion of the terminal 03 is bent to form a contact 032, the first end 031 and the printed circuit board 01 are press-fit or welded together by using a connection member 011, so as to electrically connect the terminal 03 to the printed circuit board 01. The contact end 032 is configured to electrically connect to the function card, and then the function card may be electrically connected to the printed circuit board 01 by using the terminal 03. Moreover, to match deformation occurring in the terminal 03 when the function card is installed, a second end 033 of the terminal 03 is connected, in a slidable manner, to a supporting portion 012 disposed on the printed circuit board 01.

However, as shown in FIG. 1, in the solution in the prior art, the card holder 02 is fastened onto the printed circuit board 01, and the function card is installed on the card holder 02. Consequently, a height of the card holder 02 directly affects an overall thickness of the electronic device in which the function card is installed. This is unfavorable to lightening, thinning and aesthetic design of the product. Additionally, in the prior art, to electrically connect the terminal 03 to the printed circuit board 01, the first end 031 of the terminal 03 is fastened to the printed circuit board 01 by using the connection member 011, and moreover, the printed circuit board 01 is provided with the supporting portion 012 corresponding to the second end 033 of the terminal 03, so that when deformation occurs in the terminal 03, the second end 033 may slide on the supporting portion 012. In this way, a connection point between the terminal 03 and the printed circuit board 01 also has a thickness, and the supporting portion 012 also have a thickness. Consequently, an entire thickness of the electronic device is relatively large. This is more unfavorable to lightening, thinning and aesthetic design of the product.

SUMMARY

Embodiments of this application provide an electronic device, to reduce an overall thickness of the electronic device. This is favorable to lightening, thinning and aesthetic design of the product.

To achieve the foregoing objective, the following technical solution is used in the embodiments of this application.

According to a first aspect of this application, an electronic device is provided. The electronic device includes a printed circuit board and a card holder, where the card holder is configured to hold a function card, the printed circuit board is provided with a groove, the card holder is disposed in the groove, a bottom surface of the groove is provided with n metal solder pads and n printed wires, the n metal solder pads are electrically connected to the n printed wires in a one-to-one correspondence, n terminals in a one-to-one correspondence to the n metal solder pads are disposed on the card holder, each terminal is provided with a first contact and a second contact, the first contact is connected to and in contact with one of the n metal solder pads, and the second contact is configured to connect to and be in contact with a metal contact of the function card placed in the card holder.

Based on the electronic device provided in the embodiments of this application, the printed circuit board is provided with the groove, and the card holder is disposed in the groove. Compared with the prior art, the groove may directly reduce an overall thickness of the electronic device. Moreover, the bottom surface of the groove is provided with the n metal solder pads and the n printed wires, the n metal solder pads are electrically connected to the n printed wires in a one-to-one correspondence, the n terminals in a one-to-one correspondence to the n metal solder pads are disposed on the card holder, and each terminal is provided with the first contact and the second contact. The first contact is connected to and in contact with one of the n metal solder pads, and the second contact is configured to connect to and be in contact with the metal contact of the function card placed in the card holder. In this way, the first contact of the terminal is connected to and in contact with one of the n metal solder pads, and the second contact is connected to and in contact with the metal contact of the function card, so that the function card may be electrically connected to the printed circuit board. The first contact of the terminal is in contact with the metal solder pad disposed on the bottom surface of the groove of the printed circuit board. Compared with the prior art, on the premise that the terminal is electrically connected to the printed circuit board, the terminal is fastened to the printed circuit board without need of press-fitting or welding, a thickness of a connection member and a thickness of a supporting portion are saved from the overall thickness of the electronic device, to further reduce the overall thickness. This is more favorable to overall lightening and thinning design of the electronic device, and the electronic device is relatively aesthetic.

In a first optional implementation of the first aspect, the terminal is made of an elastic material, the first contact is elastically connected to and in contact with one of the n metal solder pads, and the second contact is configured to elastically connect to and be in contact with a metal contact of the function card placed in the card holder. The terminal is made of the elastic material, so that the first contact is elastically connected to and in contact with the one of the n metal solder pads, and the second contact is elastically connected to and in contact with the metal contact of the function card placed in the card holder. When the function card is installed, the function card is in contact with the second contact of the terminal and presses the terminal, and deformation occurs in the terminal. In this way, the second end of the terminal slides along the metal solder pad on the printed circuit board, and the first contact is always keeping in contact with the metal solder pad. The deformation of the terminal generates an elastic restoring force, so that contacting between the first contact of the terminal and the metal solder pad is more reliable, and contacting between the second contact of the terminal and the function card is more reliable.

In a second optional implementation of the first aspect, a first end of the terminal is fastened onto the card holder, a second end of the terminal is the first contact, the first contact passes through the card holder and is connected to and in contact with one of the n metal solder pads, a middle portion of the terminal is bent toward the function card to form the second contact, and the second contact is configured to connect to and be in contact with a metal contact of the function card placed in the card holder. The first end of the terminal is fastened onto the card holder, so as to fasten the terminal, and the second end of the terminal passes through the card holder, so that the terminal is connected to and in contact with the metal solder pad, and then electrically connected to the printed circuit board by using the printed wire. Moreover, the middle portion of the terminal is bent toward the function card, so that the terminal is electrically connected to the function card. In this way, the function card is electrically connected to the printed circuit board by using the terminal.

In a third optional implementation of the first aspect, the card holder is provided with a through-hole, the terminal is located at the through-hole, the first end of the terminal is fastened to a side wall of the through-hole, and the second end of the terminal passes through the through-hole, so that the first contact is connected to and in contact with one of the n metal solder pads. A size of the through-hole of the card holder may be set in a plurality of manners. For example, an area of the through-hole is slightly greater than an area of a radial cross-section of the terminal, and only needs to be sufficient for the second end of the terminal to pass through. However, to reserve sufficient deformation space for the terminal, the terminal may be alternatively disposed at the through-hole, and the size of the through-hole may make deformation occur in the entire terminal in the through-hole.

In a fourth optional implementation of the first aspect, n equals 6, 7, or 8. Electrical connection between the function card and the printed circuit board usually needs connection among a plurality of lines. Therefore, a quantity of the terminals and a quantity of the metal solder pads are both set to n, and the terminals are in a one-to-one correspondence to the metal solder pads, so as to match connection among n lines between the function card and the printed circuit board. Usually, a quantity of line connection points between the function card and the printed circuit board is six, seven, or eight, where six line connection points are relatively frequently used.

In a fifth optional implementation of the first aspect, a card cover covers the card holder, and the card cover is snap-fit to the card holder and is fixedly connected to the printed circuit board. The card cover is disposed above the card holder, and may play a role of protecting the function card, and the card holder may be fastened onto the printed circuit board by using the card cover.

In a sixth optional implementation of the first aspect, the card cover includes a cover plate portion and a side plate portion that surrounds the cover plate portion and that extends toward the printed circuit board, the cover plate portion covers the card holder, a middle portion of the side plate portion is snap-fit to the card holder, and an end portion of the side plate portion is fixedly connected to the printed circuit board.

In a seventh optional implementation of the first aspect, a distance from the end portion of the side plate portion to the cover plate portion is 1 millimeter.

In an eighth optional implementation of the first aspect, the electronic device further includes a card tray disposed between the card holder and the card cover, where the card tray is provided with a function card installation hole, and the function card installation hole matches an outer profile of the function card. Disposition of the card tray makes it more convenient to install the function card, and the card tray is an independent component, so that function cards of a plurality of specifications may be installed by replacing the card tray.

In a ninth optional implementation of the first aspect, the side plate portion of the card cover close to a side of the first end of the terminal has an opening, and the card tray can be inserted between the card holder and the card cover through the opening. In this way, when the card tray is inserted between the card holder and the card cover through the opening, the terminal is first in contact with the second contact of the terminal, and presses the terminal. When deformation occurs in the terminal, a direction in which the second end of the terminal slides along the metal solder pad of the printed circuit board is consistent with a direction in which the card tray is inserted, making it convenient to install the card tray.

In a tenth optional implementation of the first aspect, the groove has a depth of 0.2 millimeters to 0.3 millimeters. The thickness of the printed circuit board has a standard size, and if the depth of the groove provided on the printed circuit board is excessively large, an entire strength of the printed circuit board is affected. Therefore, considering sizes of printed circuit boards of different specifications, setting the depth of the groove to be within a range of 0.2 millimeters to 0.3 millimeters does not affect the entire strength of the printed circuit board while ensuring that the overall thickness of the electronic device is reduced.

BRIEF DESCRIPTION OF DRAWINGS

Accompanying drawings that need to be used in description of embodiments or the prior art are simply described below.

DESCRIPTION OF EMBODIMENTS

The following describes the technical solutions in the embodiments of this application with reference to the accompanying drawings in the embodiments of this application.

In the description of this application, a direction or location relationship indicated by a term "center", "on", "under", "front", "rear", "left", "right", "vertical", "horizontal", "top", "bottom", "inner", "outer", or the like is a direction or location relationship shown based on the accompanying drawings, and is intended to only conveniently describe this application and simplify the description, but is not intended to indicate or imply that a mentioned apparatus or element needs to have a particular direction and is constructed and operated in the particular direction. Therefore, the direction or location relationship cannot be understood as a limitation on this application.

The terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the present invention, unless stated otherwise, the meaning of "a plurality of" is two or more than two.

In the description of this application, it should be understood that, unless explicitly specified or limited otherwise, the terms "installation", "connected", and "connection" should be understood broadly, for example, which may be fixed connection, detachable connection, or integral connection. Persons of ordinary skill in the art can understand specific meanings of the terms in this application based on specific situations.

Figure 1:
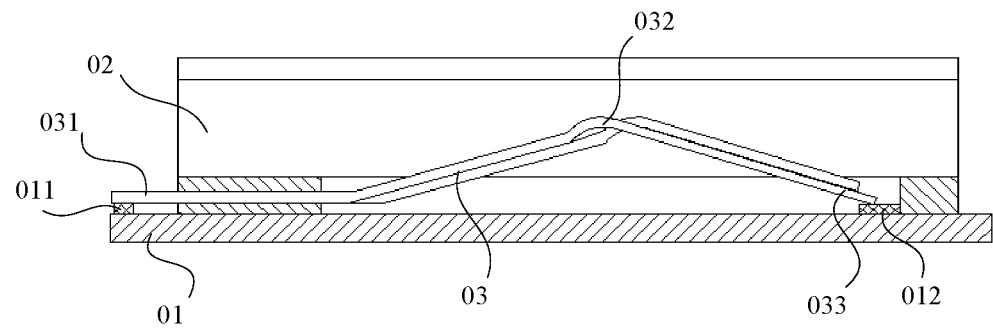
FIG. 1 is a schematic structural diagram of an electronic device in the prior art.
Figure 2:
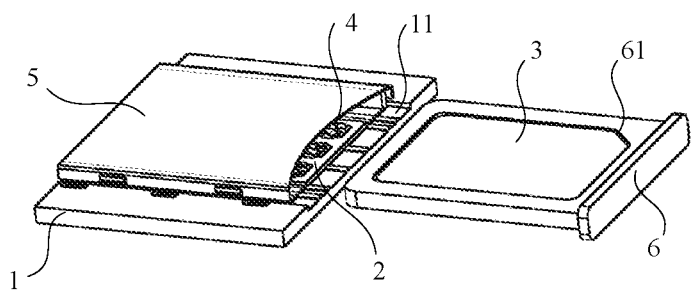
FIG. 2 is a schematic structural diagram of an electronic device according to an embodiment of this application.
Figure 3:
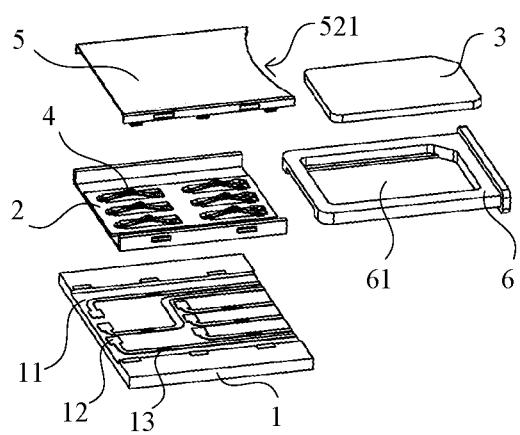
FIG. 3 is a schematic exploded structural diagram of an electronic device according to an embodiment of this application.
Figure 4:
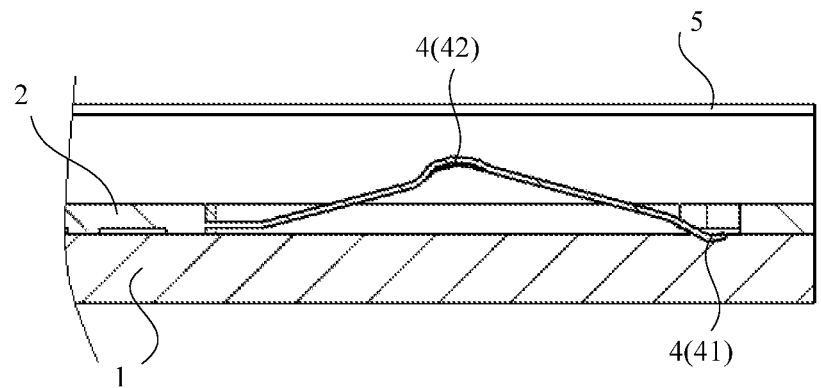
FIG. 4 is a schematic cross-sectional structural diagram of an electronic device according to an embodiment of this application.

An embodiment of this application provides an electronic device, as shown in FIG. 2, FIG. 3, and FIG. 4, the electronic device includes a printed circuit board 1 and a card holder 2. The card holder 2 is configured to hold a function card 3, the printed circuit board 1 is provided with a groove 11, the card holder 2 is disposed in the groove 11, a bottom surface of the groove 11 is provided with n metal solder pads 12 and n printed wires 13, the n metal solder pads 12 are electrically connected to the n printed wires 13 in a one-to-one correspondence, n terminals 4 in a one-to-one correspondence to the n metal solder pads 12 are disposed on the card holder 2, each terminal 4 is provided with a first contact 41 and a second contact 42, the first contact 41 is connected to and in contact with one of the n metal solder pads 12, and the second contact 42 is configured to connect to and be in contact with a metal contact of the function card 3 placed in the card holder 2.

Based on the electronic device provided in this embodiment of this application, the printed circuit board 1 is provided with the groove 11, and the card holder 2 is disposed in the groove 11. Compared with the prior art, the groove 11 may directly reduce an overall thickness of the electronic device. Moreover, the bottom surface of the groove 11 is provided with the n metal solder pads 12 and the n printed wires 13, the n metal solder pads 12 are electrically connected to the n printed wires 13 in a one-to-one correspondence, the n terminals 4 in a one-to-one correspondence to the n metal solder pads 12 are disposed on the card holder 2, and each terminal 4 is provided with the first contact 41 and the second contact 42. The first contact 41 is connected to and in contact with one of the n metal solder pads 12, and the second contact 42 is configured to connect to and be in contact with the metal contact of the function card 3 placed in the card holder 2. In this way, the first contact 41 of the terminal 4 is connected to and in contact with one of the n metal solder pads 12, and the metal solder pad 12 is electrically connected to the printed circuit board 1 by using the printed wire 13. The second contact 42 is connected to and in contact with a metal contact of the function card 3, and the function card 3 may be electrically connected to the printed circuit board 1. The first contact 41 of the terminal 4 is in contact with the metal solder pad 12 disposed on the bottom surface of the groove 11 of the printed circuit board 1. Compared with the prior art, on the premise that the terminal 4 is electrically connected to the printed circuit board 1, the terminal is fastened to the printed circuit board without need of press-fitting or welding, a thickness of a connection member and a thickness of a supporting portion are saved from the overall thickness of the electronic device, to further reduce the overall thickness. This is more favorable to overall lightening and thinning design of the electronic device, and the electronic device is relatively aesthetic.

It should be noted that, that the card holder 2 is disposed in the groove 11 may be that a part of the card holder 2 shown in FIG. 2 is located in the groove 11 or the card holder 2 completely sinks into the groove 11.

To make it convenient to install the function card 3 in the card holder 2, the terminal 4 is made of an elastic material, the first contact 41 is elastically connected to and in contact with one of the n metal solder pads 12, and the second contact 42 is configured to elastically connect to and be in contact with a metal contact of the function card placed in the card holder 2. Referring to FIG. 4, the terminal 4 is made of the elastic material, so that the first contact 41 is elastically connected to and in contact with the one of the n metal solder pads 12, and the second contact 42 is elastically connected to and in contact with the metal contact of the function card 3 placed in the card holder 2. When the function card 3 is installed, the function card 3 is in contact with the second contact 42 of the terminal 4 and presses the terminal 4, and deformation occurs in the terminal 4. In this way, the second end of the terminal 4 slides along the metal solder pad 12 on the printed circuit board 1, and the first contact 41 is always keeping in contact with the metal solder pad 12. The deformation of the terminal 4 generates an elastic restoring force, facilitating more reliable contacting between the first contact 41 of the terminal 4 and the metal solder pad 12, and more reliable contacting between the second contact 42 of the terminal 4 and the function card 3.

Figure 5:
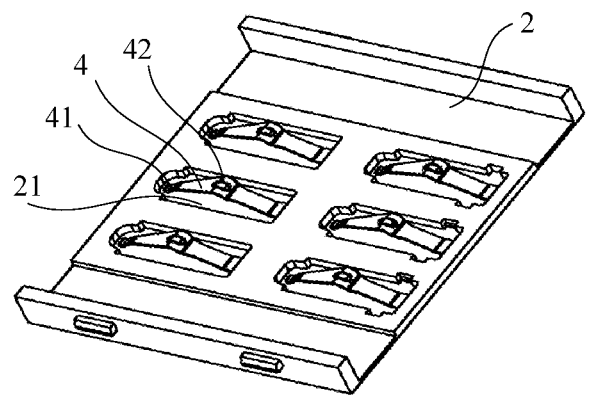
FIG. 5 is a schematic structural diagram of a card holder of an electronic device according to an embodiment of this application.

To electrically connect the function card 3 to the printed circuit board 1 by using the terminal 4, referring to FIG. 4 and FIG. 5, the first end of the terminal 4 is fastened onto the card holder, the second end is the first contact 41, the first contact 41 passes through the card holder 2 and is connected to and in contact with one of the n metal solder pads 12, a middle portion of the terminal 4 is bent toward the function card 3 to form the second contact 42, and the second contact 42 is configured to connect to and be in contact with a metal contact of the function card 3 placed in the card holder 2. The first end of the terminal 4 is fastened onto the card holder 2, so as to fasten the terminal 4, and the second end of the terminal 4 passes through the card holder 2, so that the terminal 4 is electrically connected to the printed circuit board 1. Moreover, the middle portion of the terminal 4 is bent toward the function card 3, so that the terminal 4 is electrically connected to the function card 3. In this way, the function card 3 is electrically connected to the printed circuit board 1 by using the terminal 4.

Figure 6:
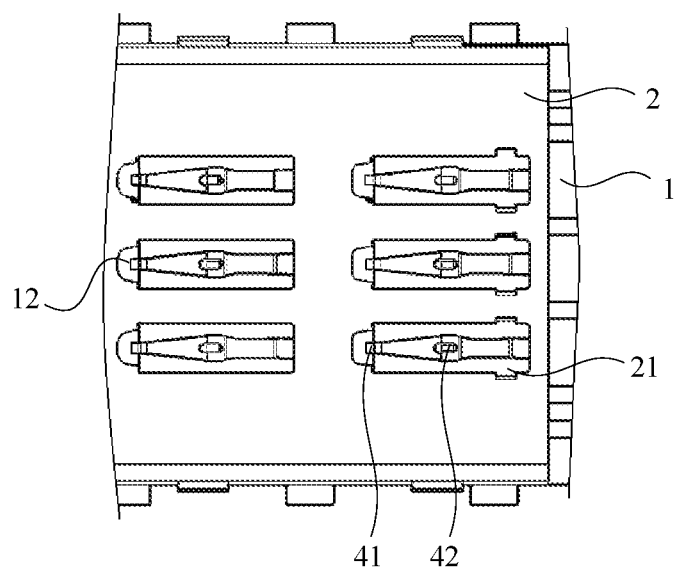
FIG. 6 is a top view of an electronic device according to an embodiment of this application.

Referring to FIG. 5 and FIG. 6, the card holder 2 is provided with a through-hole 21, the metal solder pad 12 is disposed on the printed circuit board 1, the terminal 4 is located at the through-hole 21, the first end of the terminal 4 is fastened to a side wall of the through-hole 21, and the second end of the terminal 4 passes through the through-hole 21, so that the first contact 41 is connected to and in contact with one of the n metal solder pads 12. A size of the through-hole 21 of the card holder 2 may be set in a plurality of manners. For example, an area of the through-hole 21 is slightly greater than an area of a radial cross-section of the terminal 4, and only needs to be sufficient for the second end of the terminal 4 to pass through. However, to reserve sufficient deformation space for the terminal 4, as shown in FIG. 5, the terminal 4 is disposed at the through-hole 21, and the size of the through-hole 21 may make deformation occur in the entire terminal 4 in the through-hole 21, thereby ensuring sufficient deformation space of the terminal 4, and facilitating reduction of a distance between the function card 3 and the printed circuit board 2, to further reduce the overall thickness of the electronic device.

Figure 7:
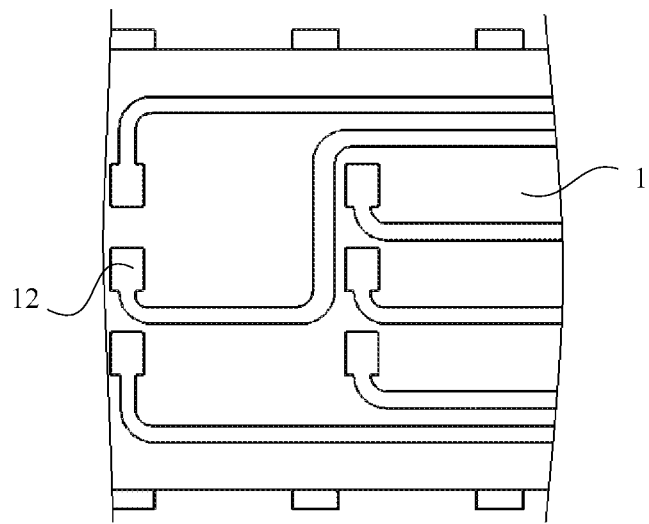
FIG. 7 is a top view of a printed circuit board of an electronic device according to an embodiment of this application.

Electrical connection between the function card 3 and the printed circuit board 1 usually needs connection among n lines. Usually, a quantity of line connection points between the function card 3 and the printed circuit board 1 is six, seven, or eight, where six line connection points are relatively frequently used. Therefore, n equals 6, 7, or 8. For example, as shown in FIG. 5 and FIG. 7, six terminals 4 are evenly distributed on the card holder 2, and there are six metal solder pads 12 that are in a one-to-one correspondence to the first contacts 41 of the terminal 4. A quantity of the terminals 4 and a quantity of the metal solder pads 12 are both set to six, and the terminals 4 are in a one-to-one correspondence to the metal solder pads 12. This may match connection among six lines between the function card 3 and the printed circuit board 1. Certainly, if a case in which a quantity of line connection points between the function card 3 and the printed circuit board 1 is eight needs to be matched, each of the quantity of the terminals 4 and the quantity of the metal solder pads 12 may be set to eight in a one-to-one correspondence.

As shown in FIG. 2 and FIG. 3, a card cover 5 covers the card holder 2, and the card cover 5 is snap-fit to the card holder 2 and is fixedly connected to the printed circuit board 1. The card cover 5 is disposed above the card holder 2, and may play a role of protecting the function card 3, and the card holder 2 may be fastened onto the printed circuit board 1 by using the card cover 5.

Figure 8:
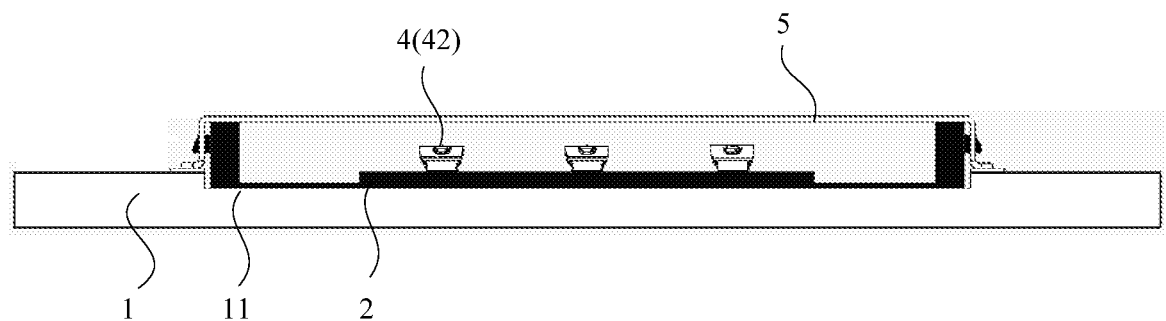
FIG. 8 is a side view of a card holder of an electronic device installed on a printed circuit board according to an embodiment of this application.
Figure 9:
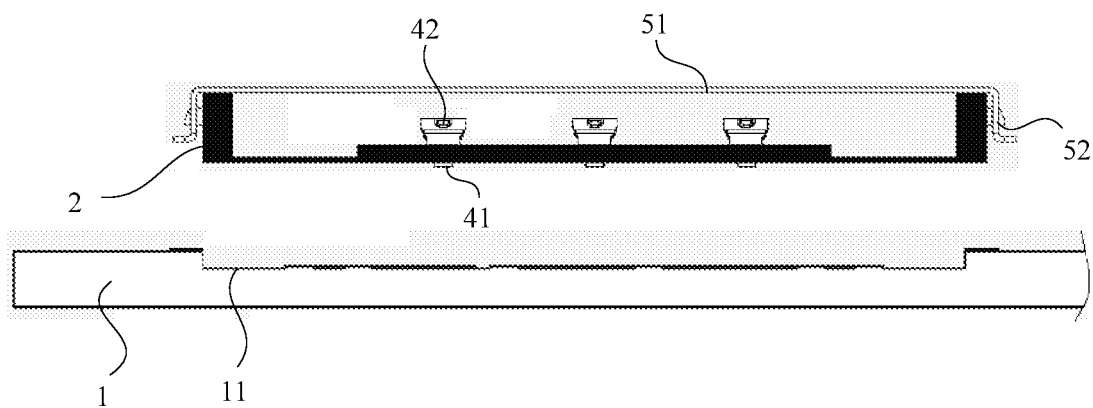
FIG. 9 is a side view of a card holder of an electronic device not installed on a printed circuit board according to an embodiment of this application.

To be favorable to fastening the card holder 2 onto the printed circuit board 1 by using the card cover 5, as shown in FIG. 8 and FIG. 9, the card cover 5 includes a cover plate portion 51 and a side plate portion 52 that surrounds the cover plate portion 51 and that extends toward the printed circuit board 1, the cover plate portion 51 covers the card holder 2, a middle portion of the side plate portion 52 is snap-fit to the card holder 2, and an end portion of the side plate portion 52 is fixedly connected to the printed circuit board 1.

The end portion of the side plate portion 52 of the card cover 5 is configured to connect to the printed circuit board, and the cover plate portion 51 of the card cover 5 covers the card holder 2. Therefore, to reserve space that is used to install the function card 3 and that is between the cover plate portion 51 and the printed circuit board 1, a distance from the end portion of the side plate portion of the card cover 5 to the cover plate portion 51 is limited. It is verified, by performing a plurality of times of experiments, that the distance from the end portion of the side plate portion 52 to the cover plate portion 51 is set to 1 millimeter.

For convenience of installing the function card 3, as shown in FIG. 2 and FIG. 3, the electronic device further includes a card tray 6 disposed between the card holder 2 and the card cover 5. The card tray 6 is provided with a function card installation hole 61, and the function card installation hole 61 matches an outer profile of the function card 3. After the card tray 6 is disposed, it is more convenient to install the function card, and the card tray 6 is an independent component, so that function cards 3 of a plurality of specifications may be installed by replacing the card tray 6. It should be noted that, referring to FIG. 3, the function card installation hole 61 on the card tray 6 may be designed into a shape that may match installation of function cards 3 of a plurality of specifications, and then the function cards 3 of the plurality of specifications can be installed.

Referring to FIG. 2 and FIG. 3, the side plate portion 52 of the card cover 5 close to a side of the first end of the terminal 4 has an opening 521, and the card tray 6 can be inserted between the card holder 2 and the card cover 5 through the opening 521. In this way, when the card tray 6 is inserted between the card holder 2 and the card cover 5 through the opening 521, the terminal 4 is first in contact with the second contact 42 of the terminal 4, and presses the terminal 4. When deformation occurs in the terminal 4, a direction in which the second end of the terminal 4 slides along the metal solder pad 12 of the printed circuit board 1 is consistent with a direction in which the card tray 6 is inserted, making it convenient to install the card tray.

A depth of the groove 11 provided on the printed circuit board directly determines the overall thickness of the electronic device. Through actual verification, the depth of the groove 11 is appropriately 0.2 millimeters to 0.3 millimeters. Referring to FIG. 8 and FIG. 9, the thickness of the printed circuit board 1 has a standard size, and if the depth of the groove 11 provided on the printed circuit board 1 is excessively large, an entire strength of the printed circuit board 1 is affected. Therefore, considering sizes of printed circuit boards 1 of different specifications, setting the depth of the groove 11 to be within a range of 0.2 millimeters to 0.3 millimeters does not affect the entire strength of the printed circuit board 1 while ensuring that the overall thickness of the electronic device is reduced.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. An electronic device, comprising:
a printed circuit board comprising a groove, wherein a bottom surface of the groove comprises n metal solder pads and n printed wires, and wherein the n metal solder pads are electrically connected to the n printed wires in a one-to-one correspondence;
a card tray comprising a function card installation hole matching an outer profile of a function card, wherein the card tray is configured to hold the function card;
a card holder configured to hold the card tray, wherein the card holder is disposed in the groove; and
n terminals that are in a one-to-one correspondence with the n metal solder pads and that are disposed on the card holder, wherein each of the n terminals comprises a first contact and a second contact, wherein the first contact of each of the n terminals is coupled to and in contact with a corresponding one of the n metal solder pads, wherein the second contact of each of the n terminals is configured to couple to and to be in contact with a metal contact of the function card when the function card is placed in the card holder, and wherein n is an integer greater than one.

2. The electronic device of claim 1, wherein the groove has a depth of 0.2 millimeters to 0.3 millimeters.

3. The electronic device of claim 1, wherein a first end of each of the n terminals is fastened onto the card holder, wherein a second end of each of the n terminals is the first contact, wherein the first contact of each of the n terminals extends through the card holder and is coupled to and in contact with a corresponding one of the n metal solder pads, wherein a middle portion of the n terminals is bent toward the function card to form the second contact, and wherein the second contact is configured to couple to and be in contact with the metal contact when the function card is placed in the card holder.

4. The electronic device of claim 3, further comprising a card cover that covers the card holder, wherein the card cover is snap-fit to the card holder and is fixedly coupled to the printed circuit board.

5. The electronic device of claim 4, wherein the card cover comprises a cover plate portion and a side plate portion, wherein the side plate portion surrounds the cover plate portion and extends toward the printed circuit board, wherein the cover plate portion covers the card holder, wherein a middle portion of the side plate portion is snap-fit to the card holder, and wherein an end portion of the side plate portion is fixedly coupled to the printed circuit board.

6. The electronic device of claim 5, wherein a distance from the end portion of the side plate portion to the cover plate portion is 1 millimeter.

7. The electronic device of claim 6, wherein the card tray is disposed between the card holder and the card cover.

8. The electronic device of claim 7, wherein the side plate portion of the card cover that is closest to a side of the first end of each of the n terminals comprises an opening, and wherein the card tray is configured to be inserted between the card holder and the card cover through the opening.

9. The electronic device of claim 3, wherein the card holder comprises a through-hole, wherein each of the n terminals is located at the through-hole, wherein the first end of each of the n terminals is fastened to a side wall of the through-hole, and wherein the second end of each of the n terminals extends through the through-hole such that the first contact of each of the n terminals is coupled to and in contact with a corresponding one of the n metal solder pads.

10. The electronic device of claim 9, further comprising a card cover that covers the card holder, wherein the card cover is snap-fit to the card holder and is fixedly coupled to the printed circuit board.

11. The electronic device of claim 9, wherein n equals six, seven, or eight.

12. The electronic device of claim 11, further comprising a card cover that covers the card holder, wherein the card cover is snap-fit to the card holder and is fixedly coupled to the printed circuit board.

13. The electronic device of claim 1, wherein each of the n terminals is made of an elastic material, wherein the first contact of each of the n terminals is elastically coupled to and in contact with a corresponding one of the n metal solder pads, and wherein the second contact of each of the n terminals is configured to elastically couple to and be in contact with the metal contact when the function card is placed in the card holder.

14. The electronic device of claim 13, further comprising a card cover that covers the card holder, wherein the card cover is snap-fit to the card holder and is fixedly coupled to the printed circuit board.

15. The electronic device of claim 14, wherein the card cover comprises a cover plate portion and a side plate portion, wherein the side plate portion surrounds the cover plate portion and extends toward the printed circuit board, wherein the cover plate portion covers the card holder, wherein a middle portion of the side plate portion is snap-fit to the card holder, and wherein an end portion of the side plate portion is fixedly coupled to the printed circuit board.

16. The electronic device of claim 13, wherein a first end of each of the n terminals is fastened onto the card holder, wherein a second end of each of the n terminals is the first contact, wherein the first contact of each of the n terminals extends through the card holder and is coupled to and in contact with a corresponding one of the n metal solder pads, wherein a middle portion of each of the n terminals is bent toward the function card to form the second contact, and wherein the second contact of each of the n terminals is configured to couple to and be in contact with the metal contact when the function card is placed in the card holder.

17. The electronic device of claim 16, wherein the card holder comprises a through-hole, wherein each of the n terminals is located at the through-hole, wherein the first end of each of the n terminals is fastened to a side wall of the through-hole, and wherein the second end of each of the n terminals extends through the through-hole such that the first contact of each of the n terminals is coupled to and in contact with a corresponding one of the n metal solder pads.

18. The electronic device of claim 17, further comprising a card cover that covers the card holder, wherein the card cover is snap-fit to the card holder and is fixedly coupled to the printed circuit board.

19. The electronic device of claim 17, wherein n equals six, seven, or eight.

20. The electronic device of claim 19, further comprising a card cover that covers the card holder, wherein the card cover is snap-fit to the card holder and is fixedly coupled to the printed circuit board.

\* \* \* \* \*